United States Patent [19]

Gruber

[11] Patent Number: 4,658,659
[45] Date of Patent: Apr. 21, 1987

[54] GYROSCOPE

[75] Inventor: Ernst Gruber, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 682,653

[22] Filed: Dec. 17, 1984

[30] Foreign Application Priority Data

Dec. 22, 1983 [DE] Fed. Rep. of Germany ....... 3346380

[51] Int. Cl.$^4$ ............................................. G01C 19/22
[52] U.S. Cl. ...................................... 74/5.46; 74/5 F; 74/5.5; 74/5.6 E
[58] Field of Search .............. 74/5 F, 5.7, 5.46, 5.6 E, 74/5.6 D, 5.5

[56] References Cited

U.S. PATENT DOCUMENTS

| | | | |
|---|---|---|---|
| 3,299,718 | 1/1967 | East | 74/5.7 X |
| 3,365,960 | 1/1968 | Siff et al. | 74/5 F X |
| 3,610,051 | 10/1971 | Siff et al. | 74/5 F |
| 4,121,143 | 10/1978 | Habermann et al. | 74/5.6 D X |

Primary Examiner—Rodney H. Bonck
Attorney, Agent, or Firm—W. G. Fasse; D. H. Kane, Jr.

[57] ABSTRACT

A gyroscope with a rotor which rotates about a nonrotating axis is simple in its structure and has but a few movable parts because the rotor axis (2) is divided into two sections by an articulation piece (8), whereby one section (2a) is connected with the housing (11) and the other section (2b) is tiltable about the articulation piece and carries the bearing axis (13) for the rotor (5). The articulation piece (8) is arranged approximately in the center of gravity of the rotor (5). The gyroscope (10) may be constructed to have one or two degrees of freedom and it may be equipped with the measuring device necessary for its operation as a displacement gyroscope or as a rate gyroscope. For a measuring operation in which the rotor (5) is driven only for the uptake, a compensating circuit is provided with an amplifier (23), a servo-control (24), and a multiplier (25) for producing a measured signal proporational to the measured quantity independently of the r.p.m. of the rotor (5). The gyroscope (10) may be driven by a spiral spring (16), electrically or pneumatically. Besides an electrical captivation, a rigid or soft captivation of the rotor axis (2) is also possible.

21 Claims, 10 Drawing Figures

GYROSCOPE

FIELD OF THE INVENTION

The invention relates to a gyroscope with a rotor which rotates about a nonrotating axis.

DESCRIPTION OF THE PRIOR ART

Displacement gyroscopes, for example vertical gyros and directional gyros, generally have three degrees of freedom and are used predominantly in aircraft and vehicles. Conventional rate gyros which are used for measuring a rotational speed in all types of vehicles as well as in flying bodies have two degrees of freedom and a measuring axis. In the simplest embodiment they are suspended in an externally located frame. Known modern rate gyros having two degrees of freedom are dynamically tuned, and comprise a rotor suspension free of torque moments. The construction of such known rate gyros includes an internally located spring joint having one or more gimbal type frame means. The precise dynamic tuning requires many individual parts to be manufactured extremely precisely. For example, high precision requirements must be met by the gimbal type spring articulation since the articulations must oscillate when a deviation of the rotor axis from the zero position occurs. These known gyroscopes, can be constructed only as a two axis arrangement even if only one axis needs to be measured. Furthermore, the technical effort and expense is in most instances too large for certain types of use, for example if the gyro is installed in a rocket which is used only once.

OBJECT OF THE INVENTION

It is the object of the invention to provide a technical gyroscope expecially a rate gyro, which is simple in its structure and which has only a few movable parts.

SUMMARY OF THE INVENTION

This object has been achieved in that the rotor axis is divided into two non-rotating sections by one or several articulation pieces or sections of which one section is rigidly connected with the housing and the other section is tiltable about the articulation pieces and which holds the bearing for the rotor. The essential advantage of the gyroscope according to the invention lies in the simplicity of its structure with only a few movable parts. Spring articulations and outer gimbals which are expensive to manufacture are obviated and are replaced by a simple nonrotating articulation piece which is not subject to any undesired torque moments if arranged in the center of gravity of the rotor. Most common gyroscope types can be realized with the gyroscope construction according to the invention. In the embodiment as a free displacement gyroscope the running axis of the rotor tilts along with a deflection and the rotor rotates about the tilted rotational axis, whereby the rotational axis can maintain the assumed slanted position without any extra features. The latter also applies to a captive gyroscope. The invention also permits realizing the most diversified embodiments of rate gyroscopes, whereby the deflection is measured electrically or a torque moment measurement takes place where a rigid or electric captivation is involved. Another substantial advantage resides in that the articulation piece can be constructed to have only one degree of freedom, whereby an inexpensive single axis gyroscope is provided which is sufficient for many purposes. Yet another advantage is seen in that the friction in the gimbal bearing which occurs in prior art simple rate gyroscopes, has been avoided. Friction in the gimbal bearing could lead to substantial measuring errors. The invention avoids such errors due to its simple construction. The present gyroscope is suitable especially for purposes in which an extremely high accuracy is not needed, for example for a one time use of short duration in remote controlled flying bodies.

BRIEF DESCRIPTION OF THE DRAWINGS

The invention will be described in more detail, by way of example with reference to the accompanying drawings, wherein.

DETAILED DESCRIPTION OF PREFERRED EXAMPLE EMBODIMENTS AND OF THE BEST MODE OF THE INVENTION

Figure 1:
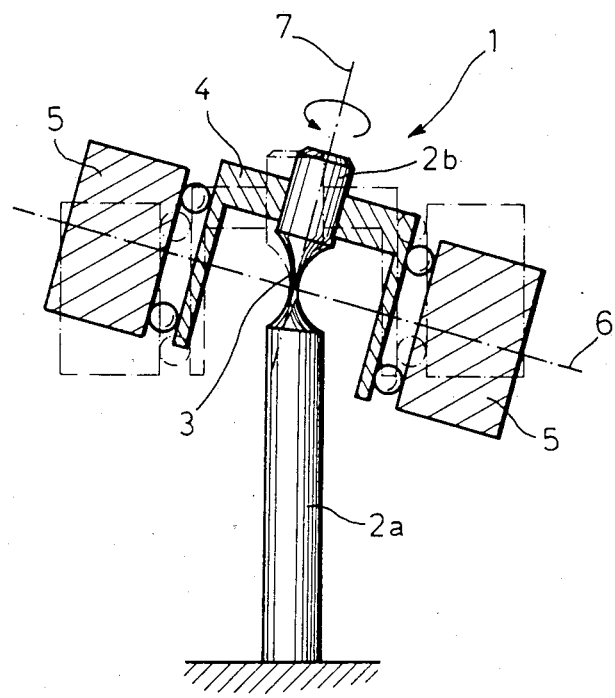
FIG. 1 shows a principle illustration of a gyroscope with one articulation piece which divides the rotor axis.

FIG. 1 illustrates a simplified embodiment of a rate gyroscope 1 with a nonrotating rotor axis 2 which is rigidly held in place at one end. The rotor axis 2 is divided into a rigid section 2a and a tiltable section 2b by an articulation piece 3 having a round cross-section. The tiltable section 2b is connected with a frame 4 on which a rotor 5 is freely rotatable. The center of gravity of the rotor 5 is located in this instance approximately in the center of the articulation piece 3 on the line 6, whereby the moment of momentum direction resulting from a measuring deflection remains always coaxial with the axial direction 7 of the rotor 5. The illustrated rate gyroscope 1 has two degrees of freedom provided by the articulation piece 3, whereby the rotor 5 tilts along with the tiltable section 2b of the rotor axis in response to a deflection and retains the assumed tilted position without any special features, thus, it is reaction free. The dash-dotted lines show the zero position of the gyroscope 1. The two-dimensional illustration in the drawing shows, however, the deflection only with regard to one degree of freedom. In a not illustrated simple manner it is possible to pick-up the angular position of the moment of momentum axis 7 in a contact-free manner and with reference to two measuring axes, either at the rotational axis 7 or at the rotor 5.

Figure 2:
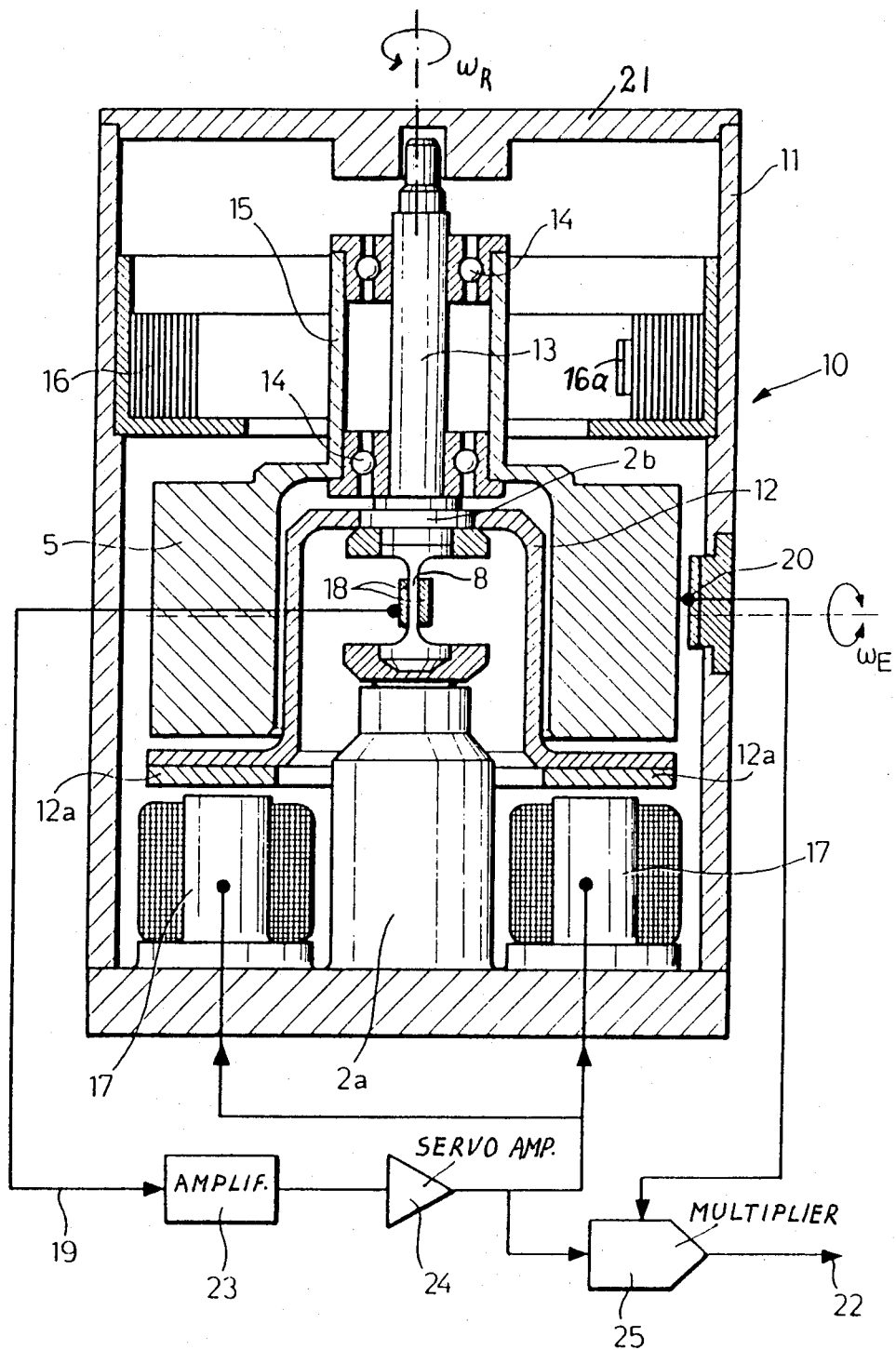
FIG. 2 shows a rate gyroscope with one degree of freedom and with a restoring articulation and further including an electrical measuring circuit and the wiring diagram for an electrical captivation.

The rate gyroscope 10 shown in FIG. 2 is an electrically captive self-restoring gyro with one degree of freedom and serves for measuring the angular speed or input quantity $\omega_E$ of a carrier, preferably a flying object. The gyroscope 10 comprises substantially a housing 11 with a housing cover 21, the rotor axis 2 rigidly connected with the housing cover and having the two axes sections 2a and 2b subdivided by a preferably two part articulation piece 8 (see FIG. 4), a frame 12 having a bearing axis 13 and connected with the tiltable section 2b of the rotor axis on which a hub 15 with the rotor 5 rotates on ball bearings 14, a spring motor 16 engaging the hub 15 with a hook 16a, and two moment pick-up coils 17 rigidly connected with the housing 11. The pick-up coils form together with two plates 12a inserted into the frame 12, a moment pick-up. The use of the spring motor 16, here shown in its resting state, indicates that the gyroscope 10 is especially suitable for a short duration operation, for example, for the installation in a flying body. After the spring motor 16 has brought the rotor 5 in a very short time to its rated r.p.m., the spring hook 16a automatically releases, due to the reduction in the spring moment, from the hub 15 and the rotor 5 runs without being driven and with a measurable r.p.m. To make sure that the r.p.m. or the change in moment of momentum does not cause any sensitivity change of the rate gyroscope 10, a measuring device is provided with a compensation circuit. The measuring device comprises an electrical moment pick-up 17 and 12a, which electrically captivates the rotor axis 2b in its position, a measuring pick-up 18 and a pick-up 20 attached to the housing 11 for sensing the r.p.m. $\omega_R$ of the rotor 5. The compensation circuit produces a measuring signal 22 which is always proportional to the measured quantity independently of the r.p.m. $\omega_R$ of the rotor 5. The measuring pick-up 18 is connected through a conductor 19 to an amplifier 23 and a servo-control 24. The servo-control 24 supplies the current to the moment pick-up 17, 12a whereby this this current corresponds to the measured quantity. The servo-control also supplies the current to a multiplier 25 which multiplies the current with the reciprocal value of the r.p.m. of the rotor which is obtained by the r.p.m. pick-up 20, whereby an output or measured signal 22 is obtained which is independent of the rotor r.p.m.

Figure 3:
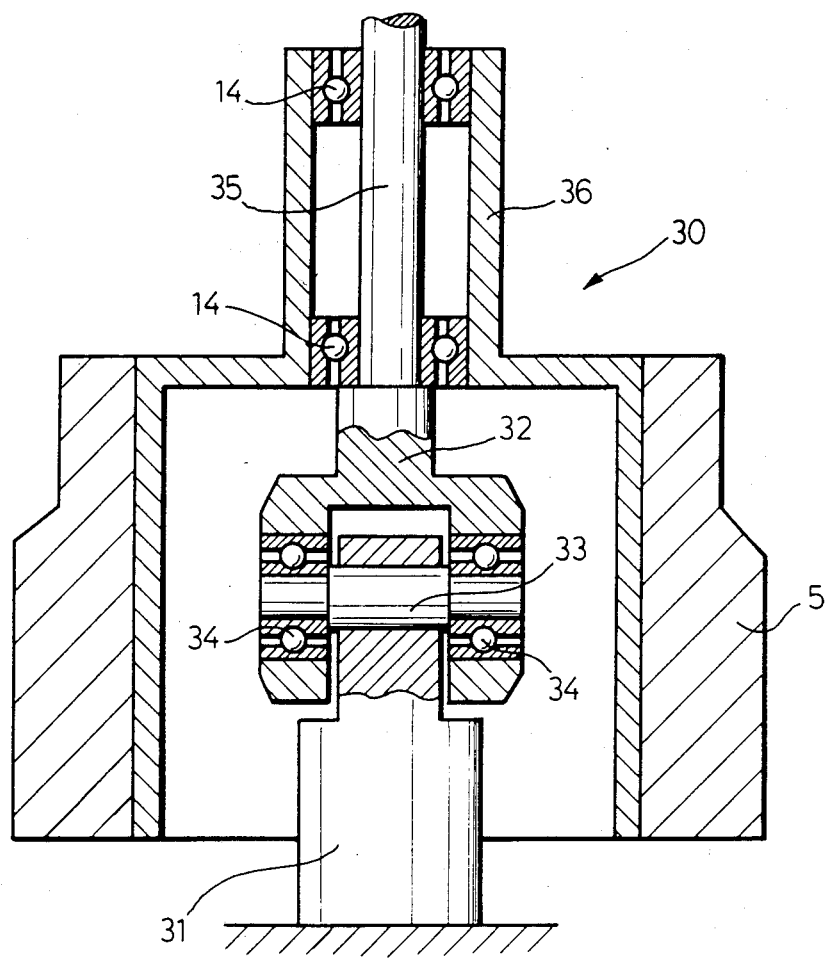
FIG. 3 shows a simplified illustration of a gyroscope with one degree of freedom and a reaction-free articulation.

FIG. 3 shows a simplified illustration of a gyroscope 30 having but one degree of freedom, whereby the measuring devices, the drives and the housing have been omitted. A rigid part 31 of the rotor axis is rotatably connected with a tiltable section 32 of the rotor axis by an articulation 33 which is substantially reaction free and has but one degree of freedom. The articulation 33 is in this instance rigidly inserted in the rigid section 31 and it is supported in the tiltable section 32 by ball bearings 34. In the illustrated embodiment thus the articulation piece 33 does not exhibit any restoring force and it is subject to minimal friction due to the ball bearings 34. The tiltable section 32 of the rotor axis extends, similarly as in FIG. 2, into a bearing axis 35 on which a hub with a frame 36 rotates on ball bearings 14, the rotor 5 being attached to the hub. The simple construction of the gyroscope 30 with only one degree of freedom requires only one simple measuring device not shown here, whereby an inexpensive gyroscope is provided for a mission of short duration. In a similar, not illustrated manner the articulation 33 may be replaced by a gimbal articulation whereby a gyroscope with two degrees of freedom is obtained but having the same basic construction.

Figure 4:
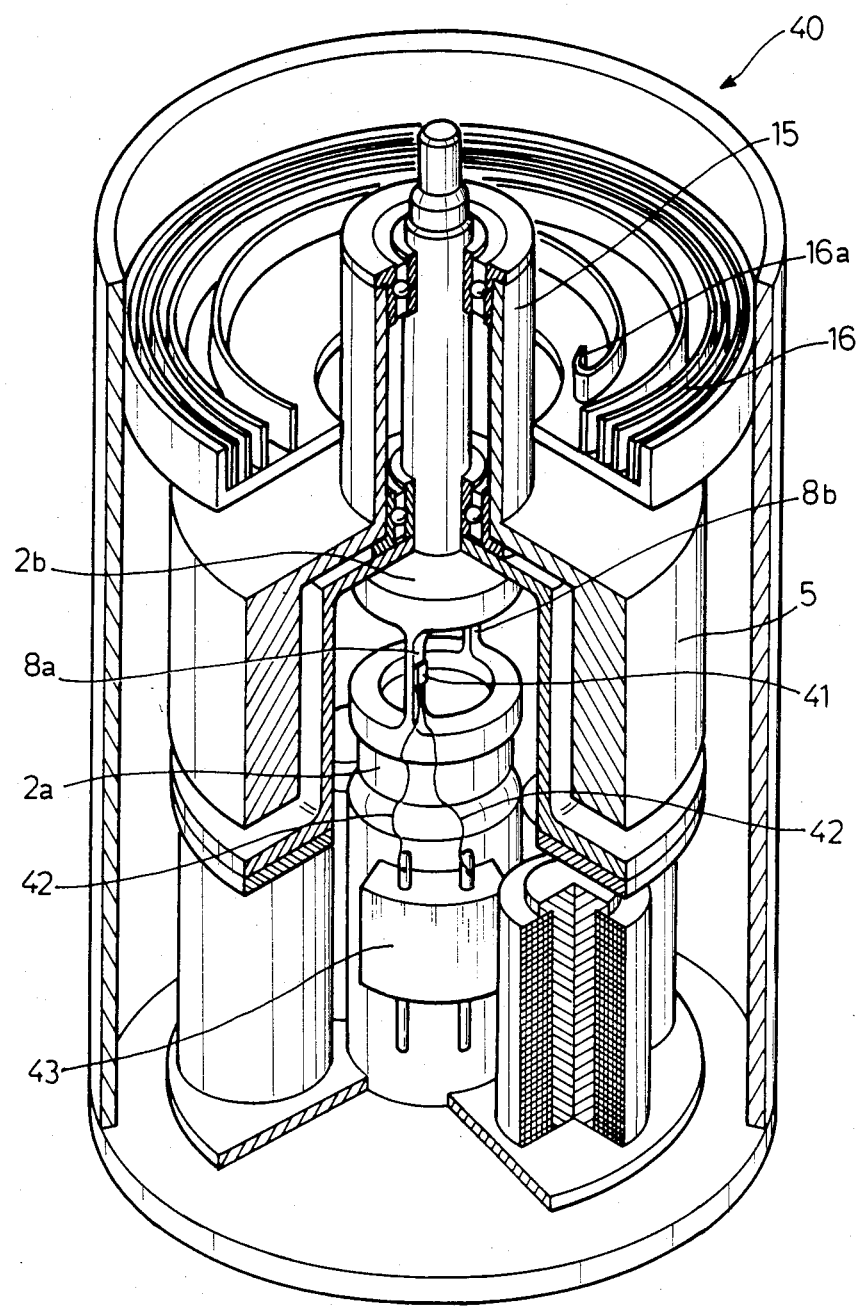
FIG. 4 shows a rate gyroscope as in FIG. 2, in a perspective illustration with a measuring pick-up using foil strain gages.

The perspective illustration of a rate gyroscope 40 according to FIG. 4 shows a variant of the captivated rate gyroscope 10 according to FIG. 2. In FIG. 4 the articulation piece 8 comprises two spring elastic articulation members 8a and 8b, whereby the rate gyroscope 40 is self-restoring and has only one degree of freedom. The measuring pick-up for sensing the deflection of the gyroscope uses foil strain gages 41 arranged at the articulation members 8a and 8b. The foil strain gages 41 are connected to an amplifier 43 through conductors 42. The amplifier 43 may, according to FIG. 2, be connected with the servo-control 24 and the multiplier 25 not shown in FIG. 4. Since here the housing cover 21 is omitted from FIG. 4, the spring motor 16 is well recognizable. The drawing shows the moment after the run-up of the rotor 5 after the spring hook 16a is disengaged from the hub 15.

Figure 5:
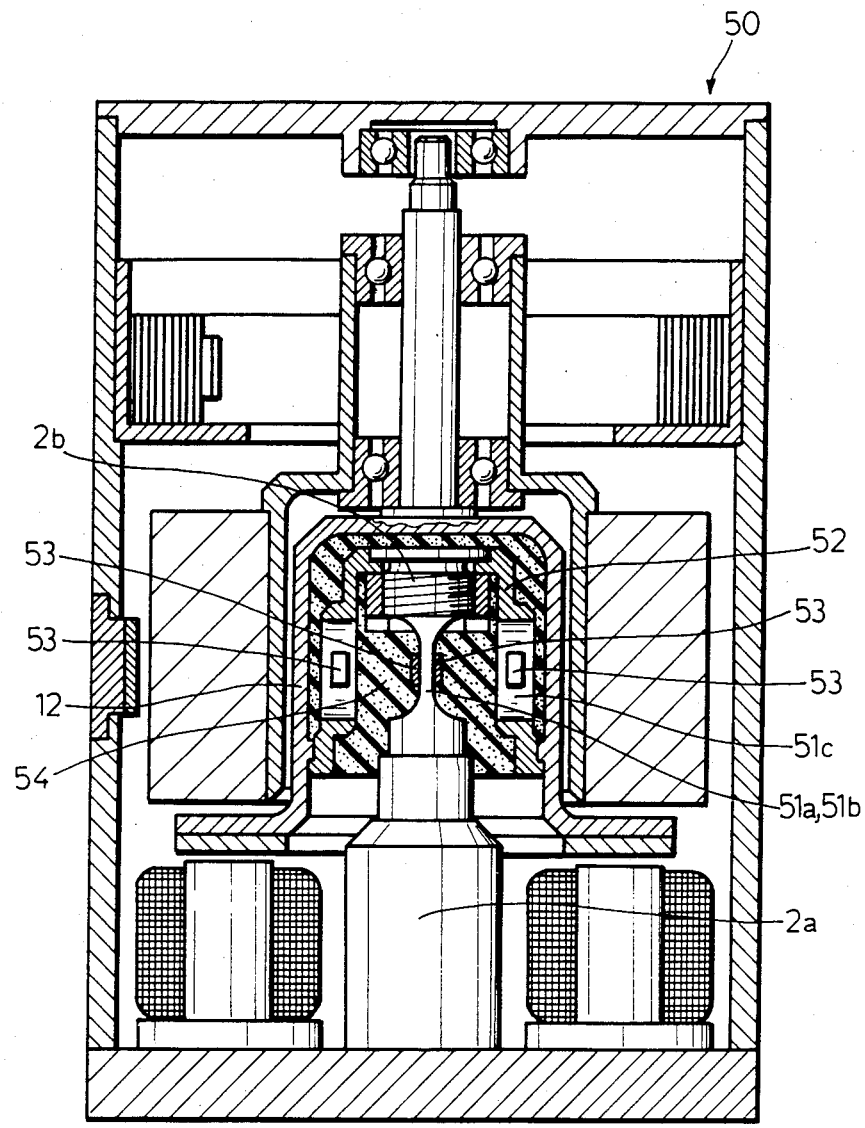
FIG. 5 shows a self-restoring rate gyroscope with two degrees of freedom.

A rate gyroscope 50 illustrated in FIG. 5 has two degrees of freedom and exhibits substantially the same simple construction as the rate gyroscopes 10 and 40 in spite of the fact that measurements can be made with regard to two axes. Only the rotor axes 2b is subdivided by articulation pieces 51a, 51b, 51c, and 51d arranged in two planes. The articulation pieces in turn separate the rigid section 2a connected to the housing from the tiltable upper section 2b which here is tiltable in two planes and which is provided with an additional frame 52 for holding the articulation pieces 51c and 51d. The measuring of the axis deflection takes place at the articulation pieces 51a to 51d in the same manner as in the gyroscopes 10 and 40 by measuring pick-ups 53 which, corresponding to FIG. 2, may be electrical measuring pick-ups or, corresponding to FIG. 4, may be foil strain gage elements. The inner frame 12 is filled with a damping material 54 for damping the tiltable section 2b of the rotor axis. In the same manner it is also possible to damp the rate gyroscopes shown in the other Figs. The measuring device may be arranged approximately in the same manner as the one described with reference to FIG. 2.

Figure 6:
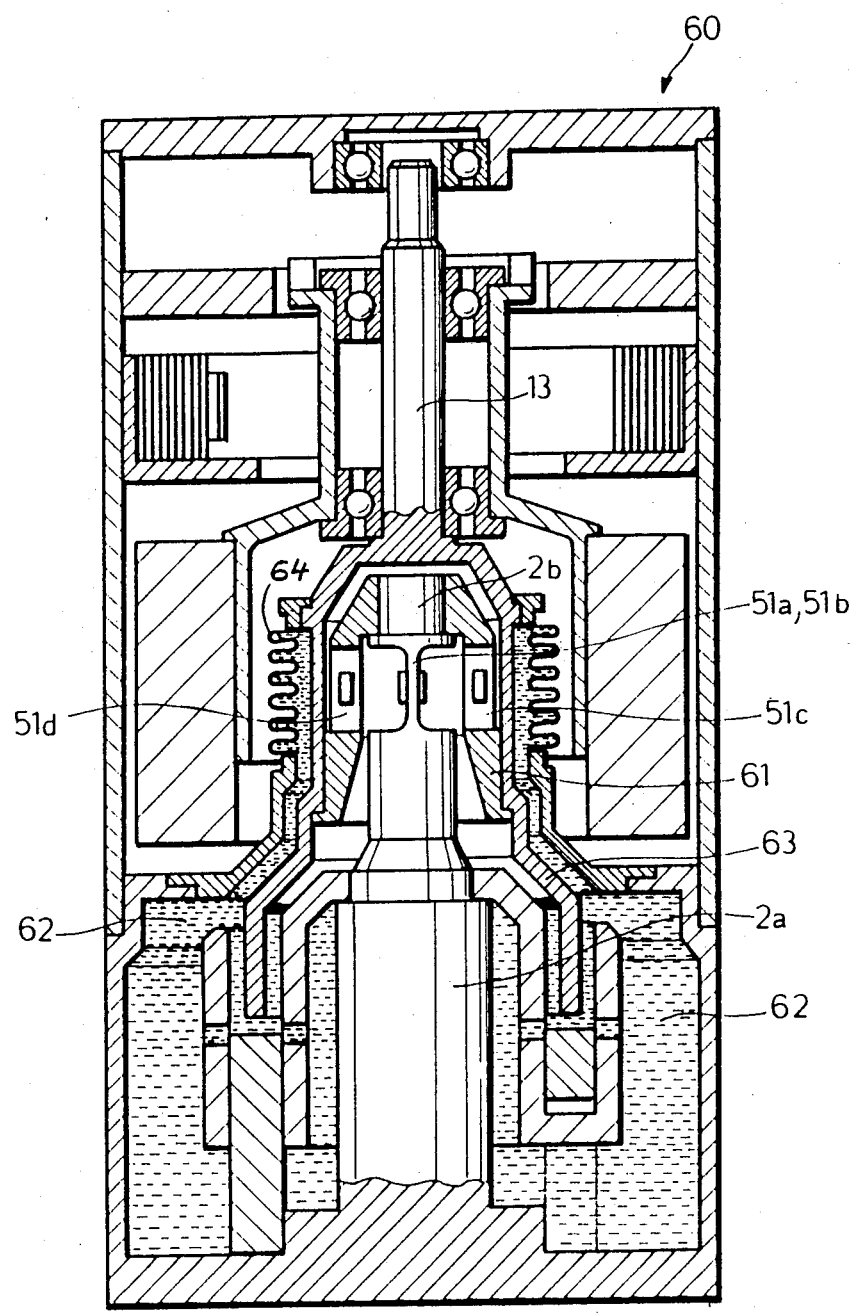
FIG. 6 shows a self-restoring rate gyroscope with two degrees of freedom and with liquid damping.

A rate gyroscope 60 illustrated in FIG. 6 resembles in its structure the gyroscope 50 shown in FIG. 5 and also having two degrees of freedom. A rigid rotor axis 2 is connected to the housing in the same manner as in FIG. 5. The rotor axis has a rigid section 2a subdivided by the two-piece articulation members 51a to 51d and the tiltable section 2b is connected to an additional frame 61 which in turn is connected with a frame 63 immersed into a damping liquid 62. The bearing axis 13 is attached to the top of the frame 63. A bellows 64 holds the liquid 62 around the upper part of the frame 63. The bellows 64 seals the gyroscope spaces filled with the liquid 62 relative to the other gyroscope parts. A measuring device may be arranged in a similar manner as described with reference to FIGS. 2 and 5.

Figure 7:
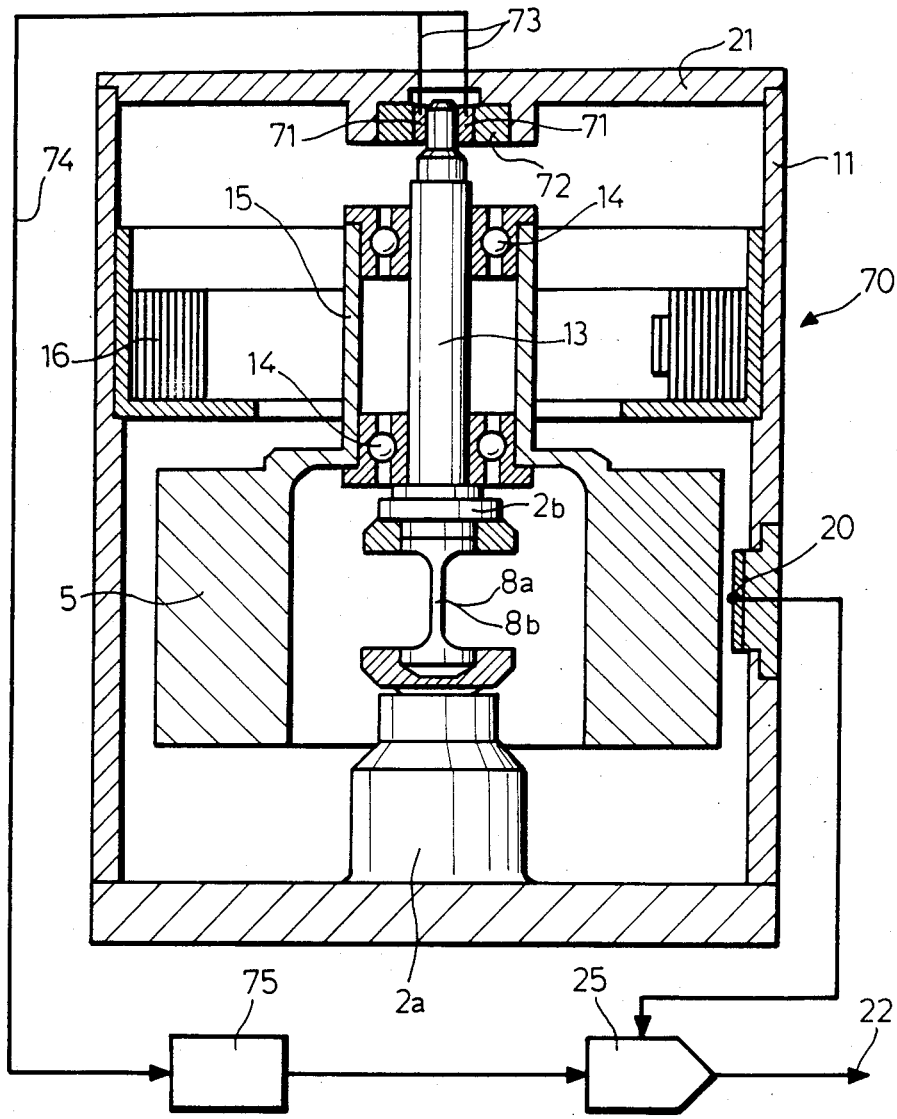
FIG. 7 illustrates a rate gyroscope with one degree of freedom and a rigid captivation by a force measuring device with piezoelements.

FIG. 7 illustrates a rate gyroscope 70 having a rigid captivation of the rotor axis 2b or of the rotor bearing axis 13 by means of a force measuring device comprising two piezoelements 71 which are inserted into a holding ring 72 in the housing cover 21. A measuring conductor 73 is connected to each of the piezoelements 71. The conductors 73 lead through a common conductor 74 to an amplifier 75 and then to the multiplier 25 in which the measured quantity from the piezoelement 71 is multiplied with the reciprocal value provided by the r.p.m. pick-up 20 for producing the output signal 22 which is independent of the rotor r.p.m. The piezoelements 71 produce a measured signal which is proportional to the holding force caused by the precision moment of the gyroscope 70. The restoring force caused by the articulation pieces 8a and 8b may be eliminated by the calibration and therefore it does not need to be taken into account.

Figure 8:
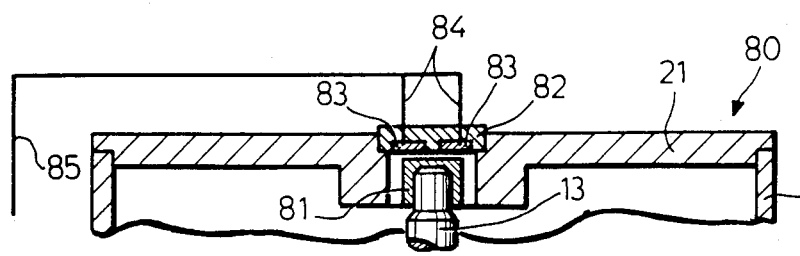
FIG. 8 shows a rate gyroscope with one degree of freedom and a soft captivation with a displacement sensor or an angular sensor provided by a magnetically measuring pick-up.

FIG. 8 shows a softly captivated rate gyroscope 18 which differs in its structure from FIG. 7 only by its magnetic pick-up in the housing cover 21. For this purpose the gyroscope 80 is provided with a displacement pick-up or an angular pick-up in the form of a magnetic measuring pick-up including a permanent magnetic cap 81 arranged on the bearing axis 13 and magnetic sensors 83 inserted in a holding ring 82 in the housing cover 21. A measured signal corresponding to the deflection of the rotor bearing axis 13 and thus proportional to the precession moment of the gyroscope 80, is produced in the magnetic sensors 83. The measuring signal is derived from the magnetic sensors 83 through measuring conductors 84 leading through a conductor 85 in a similar manner as shown in FIG. 7, to an amplifier and then to the multiplier 25. The measurement may be performed in a similar manner when the rate gyroscope 80 is subject to a soft captivation, for example, by an optoelectrical scanning.

Figure 9:
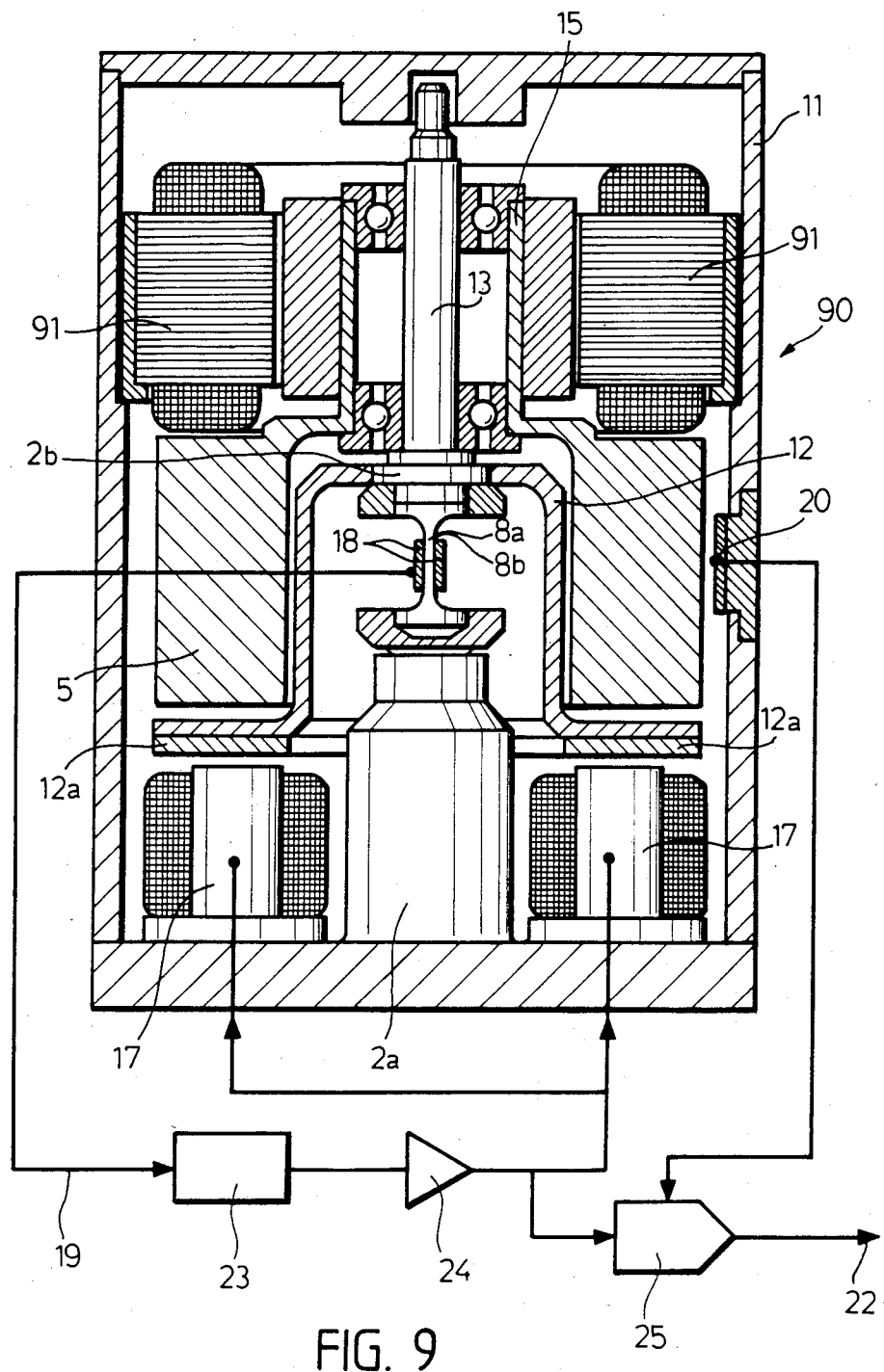
FIG. 9 shows a rate gyroscope corresponding to FIG. 2 with an electric drive.

A self-restoring, electrically captive rate gyroscope 90 is illustrated in FIG. 9. The rate gyroscope 90 corresponds, except for the rotor drive, to the rate gyroscope 10 illustrated in FIG. 2. The rate gyroscope 90 is driven by an electromotor 91 which, for example, is constructed as a hysteresis synchroneous motor or as a direct current motor. The motor is effective on the rotor hub 15 in the shown illustration, whereby the current supply takes place in a known, not shown manner through the housing 11. As a modification of FIG. 9, the motor 91 may also be arranged directly on the rotor 5.

Figure 10:
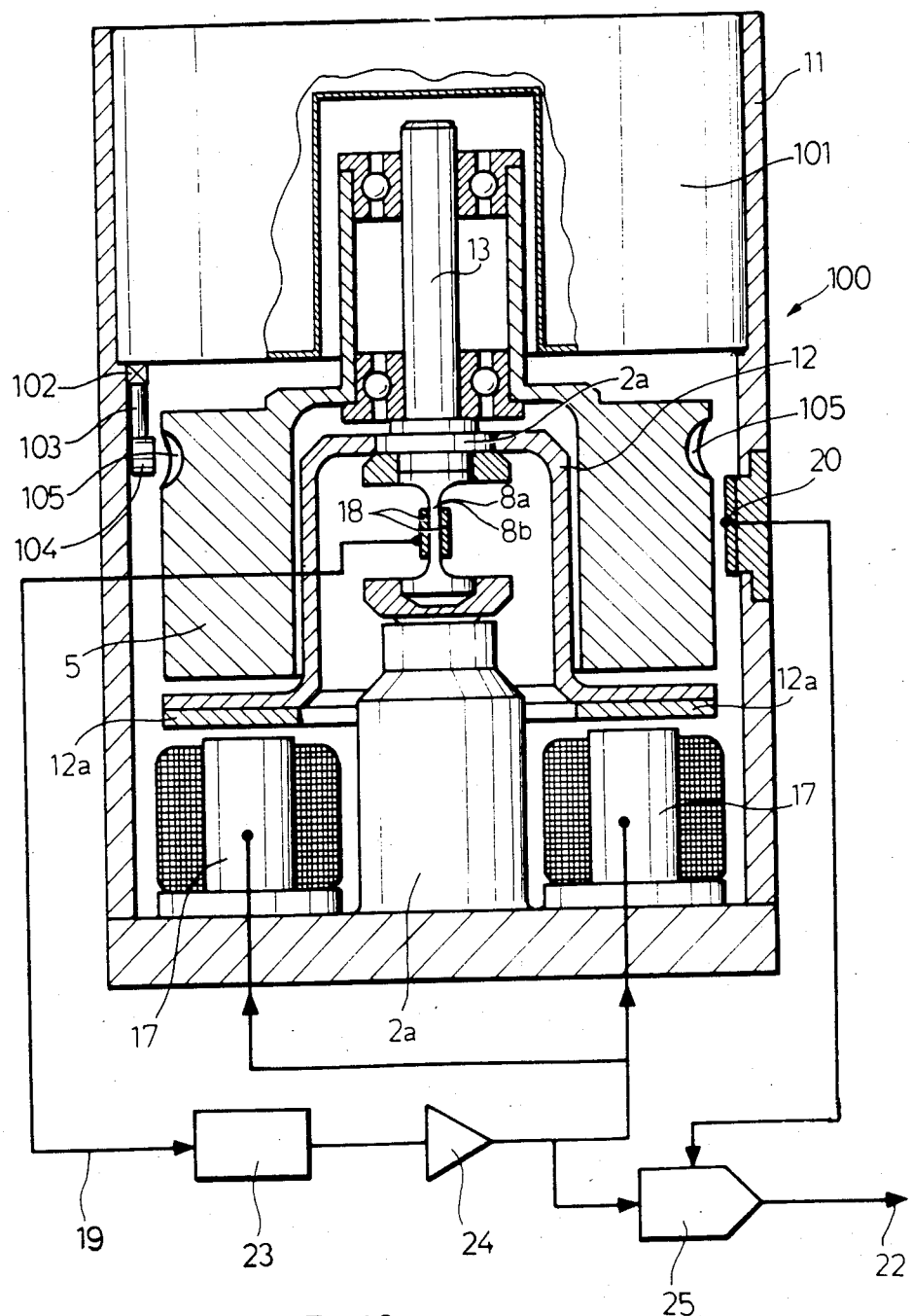
FIG. 10 shows a rate gyroscope according to FIG. 2 with a pneumatic drive.

FIG. 10 shows a pneumatically driven rate gyroscope 100 which, except for its drive, is constructed just as the gyroscope 10 in FIG. 2 or the gyroscope 90 in FIG. 9. The pneumatic drive may, for example, be operated through a pressurized gas storage 101, which, after opening a pyrotechnical opening valve 102, conducts the pressurized gas through a gas pipe 103 into a nozzle 104. The nozzle 104 charges a bucket ring 105 arranged in the rotor 5. Here again an operation of short duration is intended as in connection with the spring motor 16 until the rotor 5 has reached the intended r.p.m. The r.p.m. diminishes during the operation and is compensated by the measuring device described above in detail in FIG. 2. Instead of the pressurized gas storage 101 it is possible to use with the same good success a hot gas generator with a solid fuel charge, whereby the pyrotechnical opening valve 102 is not necessary.

Although the invention has been described with reference to specific example embodiments, it will be appreciated, that it is intended, to cover all modifications and equivalents within the scope of the appended claims.

What I claim is:

1. A gyroscope, comprising housing means, a rotor having a non-rotating axis, articulation joint means dividing said non-rotating axis into at least two axis sections for permitting a deflection of one axis section relative to the other axis section, first means for rotatably mounting said rotor in said housing means on said one axis section of said non-rotating axis, second means for rigidly mounting said other axis section in said housing means, rotor drive means operatively connectable to said rotor means for temporarily causing said rotor to rotate, first sensor means arranged for providing a first electrical signal representing said deflection of said one axis section, second sensor means arranged for providing a second electrical signal representing a rotor r.p.m., and electrical circuit means including signal multiplying means connected to said first and second sensor means for providing an output signal which is made substantially independent of said rotor r.p.m. by multiplying said first electrical signal representing said deflection with a value which is a reciprocal value of said rotor r.p.m. provided by said second electrical signal.

2. The gyroscope of claim 1, wherein said articulation joint means are arranged approximately in the center of gravity of said rotor.

3. The gyroscope of claim 1, wherein said articulation joint means have one degree of freedom.

4. The gyroscope of claim 1, wherein said articulation joint means have two degrees of freedom.

5. The gyroscope of claim 1, wherein said articulation joint means have a spring force for an elastic self-restoring of said rotor into a central position, and wherein said first sensor means are operatively attached to said articulation joint means for measuring said deflection.

6. The gyroscope of claim 5, comprising rigid captivation means for yieldingly mounting said one axis section including a rotor bearing axis.

7. The gyroscope of claim 6, wherein said first sensor means comprise force sensors forming part of said captivation means for sensing said deflection and providing said first electrical signal representing said deflection.

8. The gyroscope of claim 1, further comprising means for electromagnetically captivating said rotor, comprising a rotor frame connected to said one axis section, torque moment plates attached to said rotor frame, and torque moment coil means mounted in said housing means for cooperation with said torque moment plates for captivating said rotor in response to servo signals received from said electrical circuit means.

9. The gyroscope of claim 1, wherein said first sensor means are arranged on said rotor axis for sensing said deflection, and wherein said second sensor means are arranged relative to said rotor for sensing said r.p.m.

10. The gyroscope of claim 9, wherein said first sensor means are attached to said articulation joint means.

11. The gyroscope of claim 1, wherein said first sensing means comprise strain gage elements attached to said articulation joint means.

12. The gyroscope of claim 1, further comprising soft captivation means for said rotor axis.

13. The gyroscope of claim 12, wherein said first sensor means are attached to said rotor axis.

14. The gyroscope of claim 1, wherein said drive means directly drive said rotor.

15. The gyroscope of claim 1, wherein said rotor comprises a rotor bearing hub and wherein said rotor drive means drive said rotor bearing hub.

16. The gyroscope of claim 1, wherein said rotor drive means comprise a mechanical spring motor for rotating said rotor.

17. The gyroscope of claim 1, wherein said rotor drive means comprise an electrical motor for rotating said rotor.

18. The gyroscope of claim 1, wherein said rotor drive means comprise a pneumatic motor for rotating said rotor.

19. The gyroscope of claim 1, wherein said rotor drive means cause said rotor to rotate and are then switched off when said first and second sensing means are effective for measuring.

20. The gyroscope of claim 1, further comprising liquid damping means arranged for damping said deflection.

21. The gyroscope of claim 1, further comprising damping material surrounding said articulation joint means for damping said deflection.

* * * * *